(12) United States Patent
Henriksson et al.

(10) Patent No.: US 8,505,962 B2
(45) Date of Patent: Aug. 13, 2013

(54) FIXING CLAMP AND AIRBAG UNIT

(75) Inventors: Ola Henriksson, Vårgårda (SE); Börje Jakobsson, Brämhult (SE); Stefan Andersson, Alingsås (SE); Carl-Johan Svensson, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/375,910

(22) PCT Filed: May 27, 2010

(86) PCT No.: PCT/EP2010/003235
§ 371 (c)(1),
(2), (4) Date: Dec. 2, 2011

(87) PCT Pub. No.: WO2010/139421
PCT Pub. Date: Dec. 9, 2010

(65) Prior Publication Data
US 2012/0074673 A1    Mar. 29, 2012

(30) Foreign Application Priority Data

Jun. 4, 2009 (DE) .......................... 10 2009 023 923

(51) Int. Cl.
*B60R 21/20* (2011.01)
(52) U.S. Cl.
USPC ..................................................... 280/728.2
(58) Field of Classification Search
USPC ..................................................... 280/728.2
See application file for complete search history.

(56) References Cited

U.S. PATENT DOCUMENTS

| 4,843,686 | A | | 7/1989 | Bartholomew | |
|---|---|---|---|---|---|
| 5,966,781 | A | * | 10/1999 | Geiger | 24/16 PB |
| 6,073,961 | A | * | 6/2000 | Bailey et al. | 280/730.2 |
| 6,152,484 | A | * | 11/2000 | Fischer et al. | 280/736 |
| 6,196,033 | B1 | * | 3/2001 | Dowdle | 70/16 |
| 6,223,389 | B1 | * | 5/2001 | Walsh et al. | 16/87.4 R |
| 6,224,089 | B1 | * | 5/2001 | Uchiyama et al. | 280/728.2 |
| 6,364,257 | B1 | * | 4/2002 | Holder | 248/74.3 |
| 6,497,429 | B2 | * | 12/2002 | Matsumoto | 280/730.2 |
| 6,783,148 | B2 | * | 8/2004 | Henderson | 280/728.2 |
| 6,802,529 | B2 | * | 10/2004 | Takedomi et al. | 280/729 |

(Continued)

FOREIGN PATENT DOCUMENTS

| DE | 3018383 C2 | 11/1981 |
|---|---|---|
| DE | 4038530 A1 | 6/1991 |

(Continued)

OTHER PUBLICATIONS

International Search Report and Written Opinion of the ISA for PCT/EP2010/003235, ISA/EP, Rijswijk, NL, mailed Oct. 6, 2010.

(Continued)

*Primary Examiner* — Nicole Verley
(74) *Attorney, Agent, or Firm* — Harness, Dickey & Pierce, P.L.C.

(57) ABSTRACT

A fixing clamp for fixing an airbag on a gas generator includes a first support portion adapted to the outer shape of the gas generator and a second wrapping portion extending from the support portion. The wrapping portion with its free end can be connected to the support portion. The wrapping portion is designed to be extensible.

15 Claims, 2 Drawing Sheets

(56) References Cited

U.S. PATENT DOCUMENTS

| | | | |
|---|---|---|---|
| 7,011,337 B2* | 3/2006 | Aoki et al. | 280/730.2 |
| 7,654,555 B2* | 2/2010 | Schaupp et al. | 280/728.2 |
| 7,775,549 B2* | 8/2010 | Einsiedel et al. | 280/728.2 |
| 7,789,414 B2* | 9/2010 | Blackburn | 280/728.2 |
| 7,823,914 B2* | 11/2010 | Cheal et al. | 280/730.2 |
| 7,862,075 B2* | 1/2011 | Minamikawa | 280/730.1 |
| 7,963,548 B2* | 6/2011 | Oestergren | 280/728.2 |
| 7,976,055 B2* | 7/2011 | Son | 280/728.2 |
| 8,215,664 B2* | 7/2012 | Arima et al. | 280/728.2 |
| 8,226,117 B2* | 7/2012 | Honold et al. | 280/740 |
| 8,286,993 B1* | 10/2012 | Arima et al. | 280/728.2 |
| 8,302,990 B2* | 11/2012 | Arima et al. | 280/728.2 |
| 2005/0046160 A1 | 3/2005 | Totani et al. | |
| 2006/0131842 A1* | 6/2006 | Meier | 280/728.2 |
| 2007/0126211 A1* | 6/2007 | Moerke et al. | 280/728.2 |
| 2008/0106074 A1* | 5/2008 | Ford | 280/728.2 |
| 2008/0122203 A1* | 5/2008 | Steinbach et al. | 280/728.2 |
| 2009/0152838 A1* | 6/2009 | Robins | 280/728.2 |
| 2010/0201106 A1* | 8/2010 | Lisseman et al. | 280/730.1 |
| 2012/0038131 A1* | 2/2012 | Muller et al. | 280/728.2 |

FOREIGN PATENT DOCUMENTS

| | | |
|---|---|---|
| DE | 20300254 U1 | 5/2003 |
| DE | 602004005112 T2 | 11/2007 |
| DE | 102006041703 A1 | 3/2008 |
| DE | 102007047480 | 4/2009 |

OTHER PUBLICATIONS

Examination Report regarding German Patent Application No. 10 2009 023 923.5, dated Oct. 2, 2012.

Examination Report regarding German Patent Application No. 10 2009 023 923.5-56, dated Mar. 5, 2010.

* cited by examiner

US 8,505,962 B2

FIXING CLAMP AND AIRBAG UNIT

CROSS-REFERENCE TO RELATED APPLICATIONS

This application is a 371 U.S. National Stage of International Application No. PCT/EP2010/003235, filed May 27, 2010, which claims priority to German Patent Application No. DE 10 2009 023 923.4, filed Jun. 4, 2009. The disclosures of the above applications are incorporated herein by reference.

FIELD

The invention relates to a fixing clamp and an airbag unit.

BACKGROUND

Airbags are by now part of a standard equipment in modern motor vehicles for protecting the passenger during an accident. When an accident is detected, the airbags are inflated and prevent the passenger from directly hitting the structure of the motor vehicle covered by the airbag during the accident. Gas generators are used for inflating the airbags, which gas generators comprise a gas generator housing and a gas generating unit located in the gas generator housing. The airbag is flow-connected to the gas generator via a filling opening, wherein the airbag with the filling opening encloses an outlet opening at the gas generator housing and is fastened to the same in a clamping manner. The connection between the airbag and the gas generator housing should be designed to be as gas-proof as possible so that no leakage losses occur as far as possible. Furthermore, the connection should be designed in such a way that it is able to absorb the axial forces resulting from the inflation of the airbag, and that the airbag does not break the gas generator housing. As the airbag is made of a textile fabric flexible in itself, it further is desirable that the connection is designed in such a way that the airbag, even in the event of shape irregularities, is fixed on the gas generator housing over the circumference, or, in the event of tolerance deviations, is fixed close to the gas generator housing.

From DE 10 2007 047 480 A1, a fixing clamp for connecting the airbag to the gas generator unit is known, which fixing clamp fixes the airbag in a clamping manner on the gas generator housing by means of hoops. The hoops extend from a first portion of the fixing clamp, in the further course wrap around the airbag and the gas generator housing inserted into the airbag, and finally end in a second portion. Fingers are provided on the second portion, which fingers slide onto a sliding surface on the first portion with a sliding surface when the fastening element is closed resulting in a closed ring. By the fingers sliding onto the sliding surface a gas-proof connection shall be provided even in the event of shape deviations of the parts involved in the connection.

However, it is a disadvantage of this embodiment that the airbag unfavourably might get between the first and the second portion and thereby constrains the sliding movement which is imperative for compensating the shape deviations. Furthermore, this embodiment is only applicable when the inlet of the airbag is designed as a free accessible tubular portion.

SUMMARY

It is the object of the invention to provide a fixing clamp of the above-described kind with a design as simple as possible. Furthermore, it shall be possible to fix the airbag on the gas generator housing in a gas-proof manner as far as possible independent of possible existing shape irregularities or shape deviations. It further is the object of the invention to provide an airbag unit providing a gas-proof fastening of the gas generator, which fastening is as easy-to-handle as possible.

To solve the objects a fixing clamp and an airbag unit comprising the features of claims 1 and 11 are proposed. Further preferred embodiments of the invention can be learned from the sub claims, the figures and the related description.

According to the invention, a fixing clamp for fixing an airbag on a gas generator is proposed, which fixing clamp comprises a first support portion adapted to the outer shape of the gas generator, and a second wrapping portion extending from the support portion, which wrapping portion with its free end can be connected to the support portion, wherein the invention is that the wrapping portion is designed to be extensible. Due to its extensibility the wrapping portion can be fastened to the support portion even in the event of shape irregularities, as for example folds or seams, in the airbag or in the event of deviations of the outer shape of the gas generator, and at the same time is able to summon up the required clamping force for fixing the airbag on the gas generator housing in a gas-proof manner. The fixing clamp is thus subdivided into two functional portions, namely, into a support portion, the shape of which is adapted to the outer shape of the gas generator, and into the extensible wrapping portion. As the outer shape of the support portion is adapted to the gas generator, the fixing clamp is pre-fixed with respect to the alignment on the gas generator, wherein the support portion due to the adapted shaping further constitutes a good gas-proof clamping surface. The wrapping portion then serves for summoning up the required clamping force between the support portion and the gas generator with the airbag located in between as well as between itself and the gas generator and the airbag clamped in a gas-proof manner. Besides the advantage of the wrapping portion due to the extensibility being able to adapt to uneven spots, the same fixing clamp can thus also be used for fastening airbags to gas generators having different outer dimensions.

The extensibility can be easily provided by the wrapping portion being formed from at least one strip having a wavelike shape. Due to the proposed wave shape even a relatively hard material can be chosen for the wrapping portion, as for example sheet steel, which material is able to absorb adequately high forces, wherein the extensibility itself is just provided by the wave shape. In this case, the material of the wrapping portion itself is not extended at all or only to a minor extent, and the extensibility is caused by a deformation of the wave shape of the strip.

It is further proposed that at least two wavelike strips are provided, and that the wavelike strips have identical dimensions and an identical wave shape. By using more than one strip the load of each single strip is reduced accordingly, wherein the identical dimensions and the identical wave shape provide the advantage that the strips show an at least more or less identical deformation behaviour and are stressed identically.

It is further proposed that at least two wavelike strips are provided, and that the wave shape of the strips is aligned to be mirror symmetrical to each other. By the use of the mirror symmetrical design of the wave shape it is ensured that independent of the size and of the direction of the forces acting in the strips, these forces in every case cancel each other out in the sidewise direction so that both the support portion and the free end of the wrapping portion are not loaded by lateral forces.

A further preferred embodiment of the invention can be realized by the wrapping portion at its free end comprising a fastening portion, and by the wrapping portion being fastenable to the support portion via the fastening portion. In compliance with the demands made on the wrapping portion, the same thus is subdivided into two portions, namely, into a portion providing the extensibility and a portion serving for the fastening. Thereby, both portions can be designed individually in accordance with their function so that the extensibility for example does not result in any disadvantages for the fastening. The same applies for the reverse case.

It is further proposed that the wrapping portion can be fixed on the support portion via a fastening means penetrating the airbag. The proposed fastening means further fixes the fixing clamp in the fastened state in relation to the airbag and also allows the gas generator to be located at an opening of the airbag, which opening does not comprise a free tubular inlet opening.

In order to further improve the gas-tightness it is further proposed that the fixing clamp in the area where the free end of the wrapping portion is connected to the support portion comprises a nose narrowing the free space between the wrapping portion, the support portion and the airbag. The nose narrowing the free space causes the airbag to be pressed onto the gas generator even in the free space which for manufacturing reasons cannot be avoided and/or at least causes the free space, through which possible leakage losses of the gas flow might escape, to be narrowed.

It is further proposed that at least one fastening portion for fastening the airbag and the gas generator to a vehicle structure is provided on the support portion. The fastening portion on the support portion is advantageous inasmuch as hereby both the airbag and the gas generator are fastened to the vehicle structure at a joint fastening point. Due to the joint fastening point the total number of fastening points required for the airbag unit can be reduced without the fastening of the gas generator as well as the fastening of the airbag thereby being changed for the worse.

The fastening portion should in particular be located on the support portion in such a way that the same in the state of the airbag and of the gas generator being fastened to the vehicle structure is covered by the airbag and/or by the gas generator. This is reasonable inasmuch as the space available for fastening airbag units increasingly decreases, what is particularly the case when fastening side airbags to the roof frame, and an installation space exceeding the outer dimensions of the airbag unit is thus not required for fastening the airbag unit.

A particularly easy way of fastening which is easy to handle without the aid of tools and even with a fastening means being difficult to access or not being accessible at all can be realized by the fastening portion comprising a hook-shaped engagement portion for engaging into an opening of the vehicle structure, and by the engagement portion being fastenable to the vehicle structure in a clamping manner by performing a rotational movement and/or a displacing movement.

Furthermore, an airbag unit comprising an airbag extending from the A-pillar to the C-pillar or to the D-pillar, a gas generator and a fixing clamp is proposed for the solution of the object, wherein the gas generator is located on the airbag approximately in the centre, and wherein the fixing clamp wraps around the gas generator as well as the portion of the airbag forming the inlet opening, which portion includes the gas generator, and wherein the fixing clamp is fixed on the airbag via the free end of the wrapping portion. The proposed solution provides the advantage that the gas generator is not only connected to the airbag in a clamping manner via the edge of the inlet opening of the same, but in addition is fixed in relation to the airbag via the free end of the wrapping portion fixed on the airbag. Furthermore, it is thus possible to also locate the gas generator in an air-tight manner at an inlet opening which is located on the side of the edge of the airbag and does not comprise a free ring-shaped edge, which can be wrapped around by the fixing clamp.

BRIEF DESCRIPTION OF THE DRAWINGS

In the following, the invention is described in more detail on the basis of a preferred embodiment. The figures show in detail.

DETAILED DESCRIPTION

Figure 1:
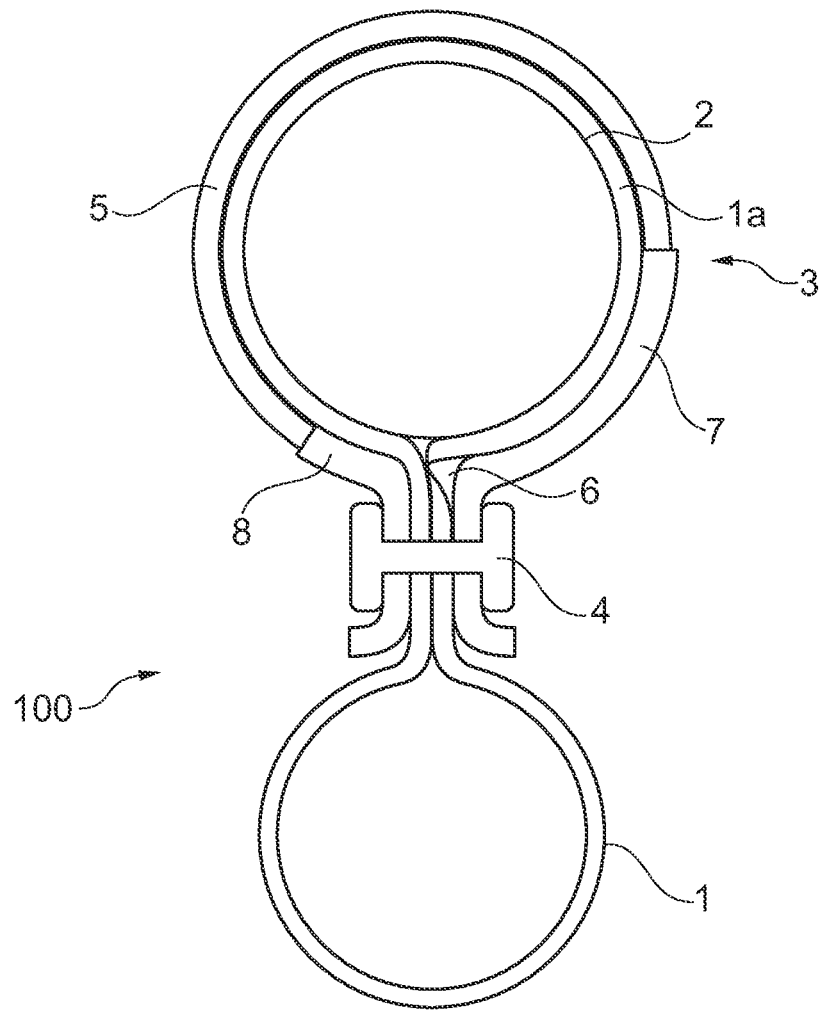
FIG. 1: Cross-sectional view of an airbag unit comprising a fixing clamp according to the invention

FIG. 1 shows a cross-sectional view of an airbag unit 100 comprising an airbag 1, a gas generator 2 and a fixing clamp 3. The airbag 1 is represented to be tubular, however, the same can have any imaginable shape. The airbag 1 with an inlet opening 1a encloses an outlet opening of the gas generator 2 so that the airbag 1 is inflated upon the ignition of the gas generating unit (not shown) in the gas generator 2. For fastening the gas generator 2 to the airbag 1 the gas generator 2 abuts on a support portion 7 of the fixing clamp 3, which support portion in its cross section is designed to be partially circular and thereby causes the position of the abutting gas generator 2 to be pre-fixed. Starting from the support portion 7 a wrapping portion 5 extends, which wrapping portion with its free end 8 is fixed on the support portion 7 via a fastening means 4, for example in the form of a rivet. The wrapping portion 5 is designed to be extensible and is intentionally designed to be shorter than the wrapped portion of the circumference of the gas generator 2 so that the same has to be extended for fastening the free end 8 and in the fastened state exerts a clamping force onto the gas generator 2 and onto the inlet opening 1a of the airbag 1 enclosing the gas generator 2. The fastening means 4 penetrates the airbag 1 and thereby further fixes the gas generator 2 on the airbag 1 via the fixing clamp 3. By designing the fixing clamp 3 according to the invention including the extensible wrapping portion 5 the airbag 1 can be connected to the gas generator 2 in a gas-proof manner even in the event of shape deviations, for example in the form of folds, seams or general irregularities in the fabric of the airbag 1 or in the housing of the gas generator 2. Furthermore, with one and the same fixing clamp 3 airbags can even be connected to gas generators having different dimensions or outer geometries.

Figure 2:
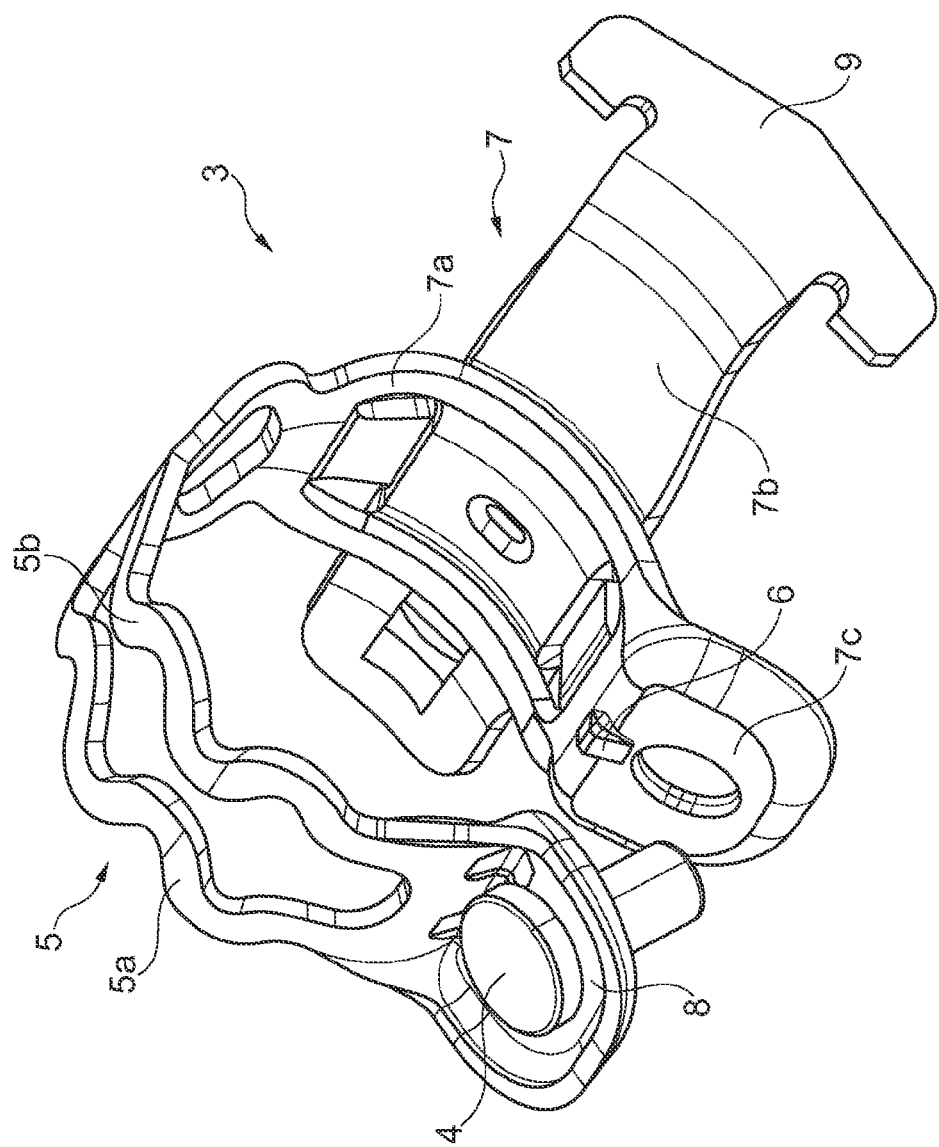
FIG. 2: Fixing clamp according to the invention

FIG. 2 shows the fixing clamp 3 in detail. The wrapping portion 5 is formed from two wavelike strips 5a and 5b adjoining the support portion 7 and at the free end 8 being connected to each other in a joint fastening portion. The support portion 7 principally has a threepart configuration and comprises a partially circular portion 7a, a fastening shoulder 7c corresponding to the fastening portion at the free end 8 of the wrapping portion 5, and a fastening means 7b for being fastened to a vehicle structure. The fastening shoulder 7c is thus formed in such a way that the same forms a contact surface for the fastening portion of the free end 8. The partially circular portion 7a with its shaping is adapted to the outer contour of the gas generator 2 with the airbag 1 located thereon, and, in particular, is designed to be uneven so that the gas generator 2 abutting on the same is aligned in a predetermined position.

On the side of the partially circular portion 7a, the fastening means 7b is inserted into a recess formed from several staggered bars. The fastening means 7b on one end is provided with a hook-shaped engagement portion 9 in the form of a T-shaped head, which engagement portion in order to be fastened to a vehicle structure can be inserted into an opening and can be fastened to this vehicle structure in a clamping manner by means of a rotational movement and/or a displacing movement. The fastening means 7b is located on the fixing clamp 3 in such a way that the same in the state of being fastened to the vehicle structure gets to rest between the gas generator and the vehicle structure so that the surface at the vehicle structure required for fastening the gas generator 2 and the airbag 1 is not needlessly increased by the fastening means 7b.

The wrapping portion 5 is designed to be extensible so that the free end 8 can be fastened to the fastening shoulder 7c by the wrapping portion 5 being subjected to an extension and the wrapping portion 5 due to the extension subsequently presses the gas generator 2 with the airbag 1 onto the partially circular portion 7a in a clamping manner. The wrapping portion 5 is formed from two wavelike strips 5a and 5b arranged to be symmetrical to each other. The extensibility of the wrapping portion 5 is provided by the deformation of the wavelike strips 5a and 5b by the strips 5a and 5b being extended in the area of the shorter fibre of the wave crests and of the wave troughs of the wave shape. In doing so, the strips need not to be extended over the whole cross section. In fact, already by the use of minor extensions of the shorter fibre an overall high extension of the strips 5a and 5b can be achieved. As the strips 5a and 5b are arranged to be symmetrical to each other and as the wave shape is identical, the extensions and loads of the strips 5a and 5b are the same as well. Furthermore, the transverse forces acting in the strips 5a and 5b are always directed in opposite directions due to the symmetrical design of the wave shape so that the fixing clamp 3, in particular the wrapping portion 5, cannot slip to the side in relation to the gas generator 2.

In the transition region between the fastening shoulder 7c and the partially circular portion 7a a nose 6 is located narrowing the free space between the fastening shoulder 7c, the free end 8 and the gas generator or rather the airbag present after the assembly and/or, in this area as well, presses the airbag 1 onto the gas generator 2 for providing a gas-proof connection, as can also be seen in FIG. 1.

The overall advantage of the fixing clamp 3 can be seen in the fact that the airbag 1 with the inlet opening can be fixed in a gas-proof manner on the gas generator 2 compensating even greater shape inaccuracies and tolerances, wherein by the use of the wave shape of the strips 5a and 5b even a material can be chosen for the fixing clamp 3, the extensibility itself of which material is not so high, however, which material has a higher strength. For example it would be possible to produce the fixing clamp 3 as a stamping part from a uniform material, wherein the characteristics of the single portions required in accordance with their purpose can be achieved individually by means of the shaping. Alternatively, the fixing clamp 3 might also be designed as a one-piece part, in which the fastening means 7b is formed directly to the partially circular portion 7a.

It is important with the fixing clamp 3 further developed according to the invention that the airbag 1 is connected to the gas generator 2 in a mechanically tight as well as in a gas-proof manner, wherein shape irregularities or tolerance deviations thus have no disadvantageous effect.

The invention claimed is:

1. A fixing clamp for fixing an airbag on a gas generator comprising:
   a first support portion adapted to an outer shape of the gas generator; and
   a second wrapping portion extending from the first support portion, the second wrapping portion with a free end thereof connected to the first support portion, the second wrapping portion being extensible;
   wherein the second wrapping portion is fixed on the first support portion via a fastening means penetrating the airbag.

2. The fixing clamp according to claim 1, wherein the wrapping portion is formed from at least one strip having a wavelike shape.

3. The fixing clamp according to claim 2, further comprising at least two wavelike strips having identical dimensions and an identical wave shape.

4. The fixing clamp according to claim 2, further comprising at least two wavelike strips which are mirror symmetrical to each other.

5. The fixing clamp according to claim 1, wherein the wrapping portion at the free end comprises a fastening portion, and further wherein the wrapping portion is fastenable to the support portion via the fastening portion.

6. The fixing clamp according to claim 1, wherein the fixing clamp in an area where the free end of the wrapping portion is connected to the support portion comprises a nose narrowing a free space between the wrapping portion, the support portion and the airbag.

7. The fixing clamp according to claim 1, further comprising at least one fastening means for fastening the airbag and the gas generator to a vehicle structure on the support portion.

8. The fixing clamp according to claim 7, wherein the fastening means is located on the support portion in such a way that the fastening means is covered by the airbag and/or by the gas generator when the airbag and the gas generator are fastened to the vehicle structure.

9. The fixing clamp according to claim 7, wherein the fastening means comprises a hook-shaped engagement portion for engaging into an opening of the vehicle structure, and that the engagement portion can be fastened to the vehicle structure in a clamping manner by performing a rotational movement and/or a displacing movement.

10. The fixing clamp according to claim 1, wherein the fastening means is a rivet.

11. An airbag unit comprising:
    an airbag;
    a gas generator;
    a fixing clamp, the fixing clamp including:
       a first support portion adapted to an outer shape of the gas generator;
       and
       a second wrapping portion extending from the support portion, the wrapping portion with a free end thereof connected to the support portion, the wrapping portion being extensible; and
    a fastener fixing the first portion on the second portion and penetrating the airbag.

12. The airbag unit according to claim 11, wherein the airbag extends from an A-pillar to a C-pillar or to a D-pillar, the gas generator is located on the airbag approximately in a center thereof, the fixing clamp wraps around the gas generator as well as the portion of the airbag forming an inlet opening, which portion includes the gas generator, and the fixing clamp is fixed on the airbag via the free end of the wrapping portion.

13. A fixing clamp for fixing an airbag on a gas generator comprising:
- a first portion for surrounding a first portion of a circumference of the gas generator; and
- a second portion being elastic, extending from the first portion and surrounding a second portion of the circumference of the gas generator, the second portion having a free end connected to the first portion;
- wherein the second portion is elastically stretched upon connection to the first portion and exerts a clamping force on the gas generator and onto an inlet opening of the airbag to connect the airbag to the gas generator in an air-tight manner.

14. The fixing clamp according to claim 13, in combination with the airbag and the gas generator.

15. The fixing clamp according to claim 14, wherein a fastener fixes the first portion on the second portion and penetrates the airbag.

* * * * *